United States Patent
Xu et al.

(10) Patent No.: US 12,430,260 B2
(45) Date of Patent: Sep. 30, 2025

(54) SORTED CHANGE LOG FOR PHYSICAL PAGE TABLE COMPRESSION

(71) Applicant: Micron Technology, Inc., Boise, ID (US)

(72) Inventors: Liping Xu, Shanghai (CN); Zhen Gu, Shanghai (CN); Qingyuan Wang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/758,335

(22) PCT Filed: Mar. 17, 2022

(86) PCT No.: PCT/CN2022/081483
§ 371 (c)(1),
(2) Date: Jul. 1, 2022

(87) PCT Pub. No.: WO2023/173369
PCT Pub. Date: Sep. 21, 2023

(65) Prior Publication Data
US 2024/0193095 A1    Jun. 13, 2024

(51) Int. Cl.
*G06F 12/1009* (2016.01)
*G06F 12/1045* (2016.01)

(52) U.S. Cl.
CPC ...... *G06F 12/1009* (2013.01); *G06F 12/1054* (2013.01); *G06F 2212/7201* (2013.01)

(58) Field of Classification Search
CPC ............ G06F 12/1009; G06F 12/1054; G06G 2212/7201
See application file for complete search history.

(56) References Cited

U.S. PATENT DOCUMENTS 9,569,348 B1 * 2/2017 Deming .................. G06F 12/00
2013/0185488 A1    7/2013 Talagala et al.
(Continued)

FOREIGN PATENT DOCUMENTS

| CN | 109032968 A | 12/2018 |
|---|---|---|
| CN | 113900584 A | 1/2022 |
| IN | 111475427 A | 7/2020 |

OTHER PUBLICATIONS

"International Search Report and Written Opinion of the International Searching Authority," issued in connection with Int'l Appl. No. PCT/CN2022/081483, dated Dec. 14, 2022 (9 pages).

*Primary Examiner* — Baboucarr Faal
(74) *Attorney, Agent, or Firm* — Holland & Hart LLP

(57) ABSTRACT

Methods, systems, and devices for a sorted change log for physical page table compression are described. A mapping between a logical address and a physical address may be stored in a change log buffer. The mapping may be stored at a location of the change log buffer based on the logical address of the mapping relative to logical addresses of other mappings stored in the change log buffer. Based on storing mappings in the change log buffer based on logical addresses of the mappings, a set of mappings in the change log may include a set of sequentially-indexed logical addresses. A compressed entry for a logical-to-physical table may be generated based on the set of mappings.

25 Claims, 6 Drawing Sheets

(56) References Cited

U.S. PATENT DOCUMENTS

| | | |
|---|---|---|
| 2014/0075136 A1* | 3/2014 | Davies .................... G06F 21/79 |
| | | 711/E12.07 |
| 2018/0357164 A1 | 12/2018 | Lee et al. |
| 2020/0225868 A1 | 7/2020 | Dalmatov et al. |
| 2020/0242021 A1 | 7/2020 | Gholamipour et al. |
| 2021/0303464 A1* | 9/2021 | Lee ....................... G06F 3/0679 |
| 2022/0004496 A1 | 1/2022 | Ha |
| 2022/0188225 A1* | 6/2022 | Li ............................ G06F 7/08 |

\* cited by examiner

SORTED CHANGE LOG FOR PHYSICAL PAGE TABLE COMPRESSION

CROSS REFERENCE

The present application for patent is a 371 national phase filing of International Patent Application No. PCT/CN2022/081483 by Xu et al., entitled "SORTED CHANGE LOG FOR PHYSICAL PAGE TABLE COMPRESSION," filed Mar. 17, 2022, assigned to the assignee hereof, and expressly incorporated by reference herein.

FIELD OF TECHNOLOGY

The following relates to one or more systems for memory, including sorted change log for physical page table compression.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

A compressed physical page table (PPT) entry may be used to reduce a size of a multi-level PPT, a quantity of write operations performed on a PPT, or both. In some examples, a compressed PPT entry may be generated if sequentially-indexed lower-level PPT entries (e.g., PPT3 entries) correspond to sequentially-indexed physical pages. A change log buffer may be used to temporarily store logical-to-physical mappings between logical addresses and physical addresses used to store data—e.g., for recent write operations. In some examples, the entries in a change log buffer may be used to generate a compressed PPT entry—e.g., in response to all of the entries in the change log buffer being sequentially-indexed.

Generating compressed physical page table (PPT) entries in response to all of the entries in a change log buffer being sequential may reduce a likelihood that a compressed PPT entry will be generated. Also, the likelihood that the compressed PPT entries will be generated may be reduced even further if the size of the change log buffer is increased. For example, because a likelihood that all entries in a change log buffer are sequentially indexed is lower. That is, it may become less likely that all of the entries in the change log buffer are sequential as the size of the change log buffer increases. Using an append-only change log buffer may further decrease the likelihood that all of the entries in the change log buffer are sequential—e.g., if the order of two write commands in a set of otherwise sequential write commands are swapped.

To increase a likelihood of a change log buffer being used to generate compressed PPT entries, a technique for ordering the entries in the change log buffers may be used. Also, a set of sequential entries in a change log buffer that does not span the entire change log buffer may be used to generate a compressed PPT entry. In some examples, a set of sequential entries in a portion of the change log buffer that may be used to generate a compressed PPT entry is based on a configuration of entries in a lower-level physical page table (e.g., PPT3 entries).

Features of the disclosure are initially described in the context of a system. Features of the disclosure are also described in the context of a subsystem, a change log buffer configuration, and a flowchart. These and other features of the disclosure are further illustrated by and described in the context of an apparatus diagram and flowchart that relate to a sorted change log for physical page table compression.

Figure 1:
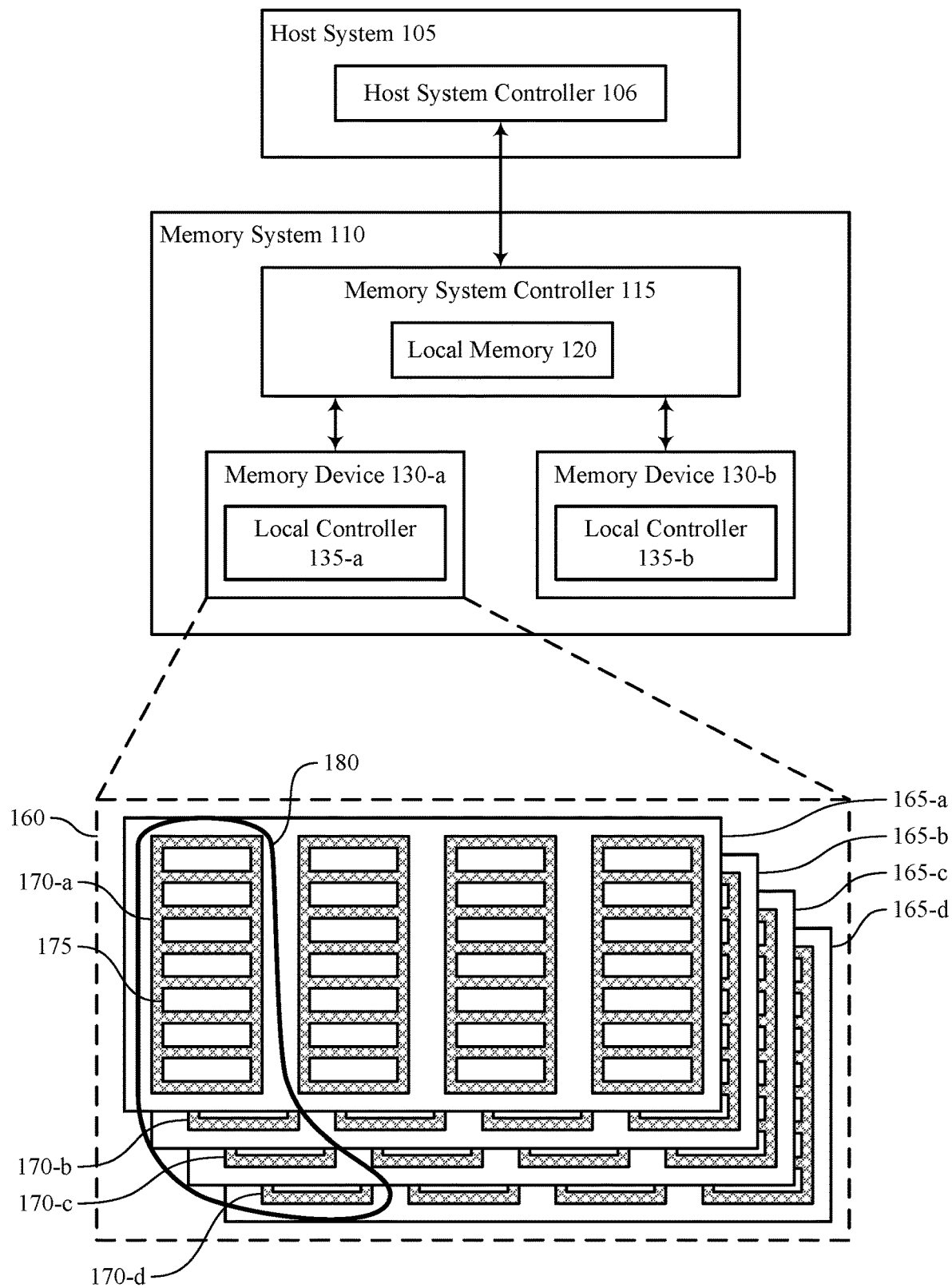
FIG. 1 illustrates an example of a system that supports a sorted change log for physical page table compression in accordance with examples as disclosed herein.

FIG. 1 illustrates an example of a system 100 that supports a sorted change log for physical page table compression in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IOT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support sorted change log for physical page table compression. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

A memory system 110 may include a change log buffer that indicates, for recent write operations, a physical address written to by a write operation as well as the logical address included in the corresponding write command. That is, the change log buffer may include mappings between the logical addresses used by a host system 105 to write data to the memory system 110 and the corresponding physical addresses used by the memory system 110 to store the data (which may be referred to as logical-to-physical mappings). In some examples, the logical-to-physical mapping of each operation may be appended to the change log buffer in an order in which the write operations are received.

A change log buffer may be used to reduce an amount of write operations to a portion of a NAND device that stores a PPT (which may also be referred to as an L2P table). In some examples, the entries in the change log buffer are used to update the PPT at the NAND device—e.g., in response to an available capacity of the change log buffer reaching a threshold, during a power-down scenario, in response to a command, etc.

As described herein, a PPT in the NAND device may store logical-to-physical mappings for the logical addresses and physical addresses managed by memory system 110. A PPT may include multiple levels—e.g., a first level (PPT1), a second level (PPT2), and a third level (PPT3). The third level may include individual entries for the logical-to-physical mappings between each logical address and physical address of a NAND device (which may be referred to as PPT3 entries). The second level may include entries that point to sets of logical-to-physical mappings in the third level (which may be referred to as PPT2 entries). For example, an entry in the second level may point to a set of logical-to-physical mappings starting with a logical address that is a multiple of a whole number (e.g., 1024), where the set of logical-to-physical mappings may include the same quantity of logical-to-physical mappings. The third level may include entries that point to sets of logical-to-physical mappings in the second level (which may be referred to as PPT1 entries).

PPT compression techniques may be used to reduce a size of a PPT, to reduce a number of write operations to a PPT, or both. A PPT compression technique may include identifying sets of logical-to-physical mappings in PPT3 entries that are sequential. That is, sets of PPT3 entries that have logical address and/or physical addresses that are sequential. Particularly, in some examples, the PPT compression technique may identify sets of sequential PPT3 entries that start with a logical address that is a multiple of 1024 and that include 1024 logical-to-physical mappings. Based on identifying such a set of PPT3 entries, the PPT compression technique may generate a compressed entry in the PPT that indicates that the identified set of PPT3 entries are sequential. For example, the PPT compression technique may update an indicator in a PPT2 entry that points to a first PPT3 entry of the set of PPT3 entries, where the indicator may indicate that the set of PPT3 entries is sequential. Thus, the memory system 110 may determine a logical-to-physical mapping for a set of logical addresses using a single PPT2 entry—e.g., instead of analyzing each PPT3 entries.

The change log buffer may be used in combination with PPT compression techniques—e.g., to reduce a size of the PPT at the NAND device, to reduce a quantity of write operations to the PPT at the NAND device, or both. For example, if all of the entries (e.g., each logical-to-physical mapping) in the change log buffer are sequential (e.g., if the logical addresses of the logical-to-physical mappings are sequential), one or more compressed PPT entry may be generated. For example, in such cases, the entries in the change log buffer may be used to generate a PPT2 entry that corresponds to a set of the sequential logical-to-physical mappings, where an indicator in the PPT2 entry may be set to indicate that the PPT3 entries pointed to by the PPT2 entry are sequential. In response to the change log buffer being flushed, one or more portions of the PPT corresponding to the logical-to-physical mappings in the change log may be loaded—e.g., into SRAM. And the compressed PPT entry may be added to (or used to overwrite a corresponding entry) in the portion of the PPT. After the portions of the PPT are updated, the PPT (or the updated portions of the PPT) may be written back to the NAND device.

Generating compressed PPT entries in response to all of the entries in a change log buffer being sequential may reduce a likelihood that a compressed PPT entry will be generated. Also, the likelihood that the compressed PPT entries will be generated may be reduced even further if the size of the change log buffer is increased. That is, it may become less likely that all of the entries in the change log buffer will be sequential as the size of the change log buffer increases. Using an append-only change log buffer may further decrease the likelihood that all of the entries in the change log buffer will be sequential—e.g., if the order of two write commands in a set of otherwise sequential write commands are swapped.

To increase a likelihood of a change log buffer being used to generate compressed PPT entries, a technique for ordering the entries in the change log buffers may be used. Also, a set of sequential entries in a change log buffer that does not span the entire change log buffer may be used to generate a compressed PPT entry. In some examples, a set of sequential entries in a portion of the change log buffer that may be used to generate a compressed PPT entry is based on a configuration of PPT3 entries in the PPT—e.g., a quantity of entries in the set of sequential entries may correspond to a quantity of entries in a PPT3 page.

In some examples, the memory system 110 may receive, from host system 105, a write command that is associated with data and a logical address for storing the data. In response to the write command, the memory system 110 may write the data to a physical address at the memory device 130-*a*, where a logical-to-physical mapping between the logical address and the physical address may be generated based on the data being written to the physical address. The memory system 110 may store the logical-to-physical mapping at a location of a change log buffer. In some examples, the resulting location of the logical-to-physical mapping in the change log buffer may be based on the logical address of the logical-to-physical mapping relative to logical addresses of other logical-to-physical mappings stored in the change log buffer.

In some examples, to store the logical-to-physical mapping at the location of the change log buffer, the memory system 110 may identify a location in the change log buffer for the logical-to-physical based on comparing a logical address of the logical-to-physical mapping with the logical addresses of the other logical-to-physical mapping. The memory system 110 may then store the logical-to-physical mapping between two logical-to-physical mappings having logical addresses below and above the logical address of the logical-to-physical mapping. Additionally, or alternatively, to store the logical-to-physical mapping at the location of the change log buffer, the memory system 110 may perform a sorting operation to sort the logical-to-physical mappings in the change log buffer based on logical address (e.g., in a descending or ascending order).

Based on the entries in the change log buffer, the memory system 100 may generate a compressed entry in a logical-to-physical table for a set of mappings stored in the change log buffer that include a set of sequentially-indexed logical addresses. The memory system 100 may use the compressed entry to compress a PPT stored in the memory device 130-*a*, reduce a quantity of write operations to a PPT stored in the memory device 130-*a*, and the like.

By sorting the logical-to-physical mappings of the change log buffer, portions (or all) of the logical-to-physical mappings in the change log buffer may be arranged to have sequentially-indexed logical addresses. By arranging the logical-to-physical mappings in a sequential fashion, one or more sets of logical-to-physical mappings that are sequentially-indexed may be identified and used to perform PPT compression.

Figure 2:
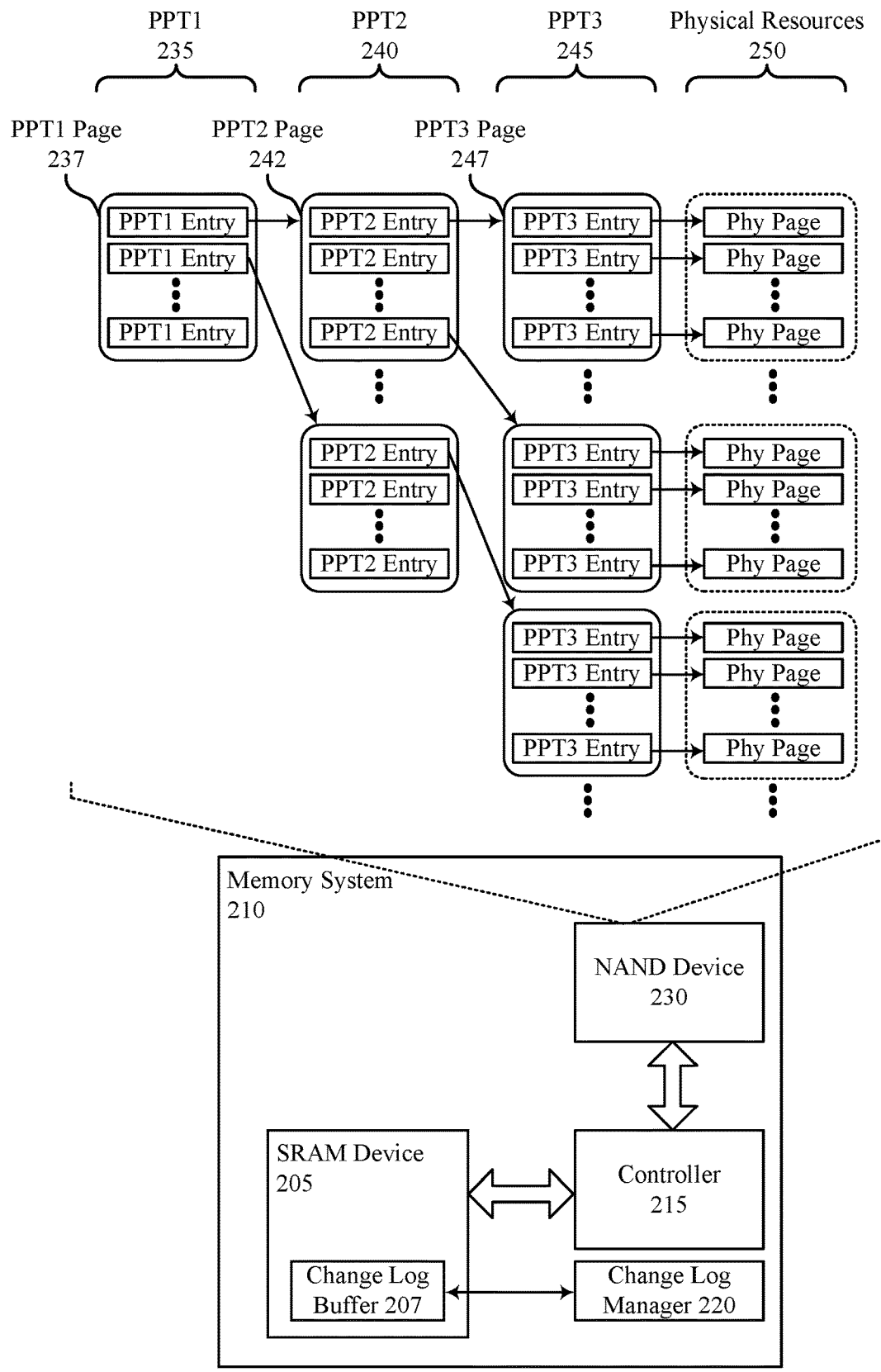
FIG. 2 illustrates an example of a subsystem that supports a sorted change log for physical page table compression in accordance with examples as disclosed herein.

FIG. 2 illustrates an example of a subsystem that supports a sorted change log for physical page table compression in accordance with examples as disclosed herein.

Subsystem 200 depicts an example configuration of a memory system as well as an example configuration of a multi-level PPT that is stored in the memory system. Memory system 210 may be an example of memory system 110 of FIG. 1. Memory system 210 may include NAND device 230, SRAM device 205, change log buffer 207, controller 215, and change log manager 220.

SRAM device 205 may be an example of memory device 130-*b* of FIG. 1. SRAM device 205 may store a portion of a PPT. For example, SRAM device 205 may store a portion of the PPT that is frequently used, has been recently used, is predicted to be used, and the like. SRAM device 205 may include volatile memory cells for storing data that can operate without being refreshed.

Change log buffer 207 may be configured to store logical-to-physical mappings for recently performed access operations (e.g., write operations, read operations, unmap operations, erase operations). For example, after receiving a write command associated with a logic address, controller 215 may write data associated with the command to a physical address. And controller 215 may store the mapping between the logical address and the physical address in change log buffer 207. In some examples, the logical-to-physical mappings include information that is the same as (or similar to) the information included in PPT3 entries.

By storing the mapping in change log buffer 207 (e.g., instead of writing the mapping to the PPT at NAND device 230), write operations to a portion of NAND device 230 that include the PPT table may be delayed or reduced (e.g., if the controller executes multiple memory operations referencing the mappings stored in the change log buffer 207). In some examples, change log buffer 207 may be implemented in SRAM device 205. For example, a set of memory cells in SRAM device 205 may be allocated to change log buffer 207. Change log buffer may include a quantity of entries (e.g., 4 k entries, 8 k entries).

Controller 215 may be an example of memory system controller 115 of FIG. 1 or, in some examples, of host system controller 106 of FIG. 1. Controller 215 may be configured to access data stored in NAND device 230 in accordance with commands received from a host system. In some examples, to access the correct physical address in NAND device 230 for a received command, controller 215 may consult the portion of the PPT stored in SRAM device 205. If the portion of the PPT stored in SRAM device 205 does not include the relevant logical-to-physical mapping, controller 215 may load a relevant portion of the PPT into SRAM device 205 that does include the relevant logical-to-physical mapping. In some examples, controller 215 may consult the logical-to-physical mappings stored in change log buffer 207 to identify the correct physical address in NAND device 230.

After performing an access operation, controller 215 may store, in change log buffer 207, a logical-to-physical mapping that indicates a mapping between the logical address of the corresponding write command and the physical address used to store data associated with the corresponding access command.

NAND device 230 may be an example of memory device 130-*a* of FIG. 1. As described herein, NAND device 230 may be used to store data for applications run at a host system and a PPT. The PPT at NAND device 230 may include logical-to-physical mappings for all of the logical addresses managed by memory system 210. In some examples, PPT compression techniques are used to decrease a size of the PPT stored at NAND device 230, to decrease an amount of information exchanged to transfer portions of the PPT to and from SRAM device 205, or both. As described herein, the PPT may be a multi-level table. For example, the PPT may include PPT1 235, PPT2 240, and PPT3 245.

PPT1 235 may include one or more PPT1 pages (e.g., PPT1 page 237). Each entry in PPT1 page 237 may point to a PPT2 page of PPT2 240. For example, the first entry in PPT1 235 may point to PPT2 page 242, the second entry in PPT1 235 may point to a second PPT2 page, and so on.

PPT2 240 may include multiple PPT2 pages (e.g., PPT2 page 242). Each entry in PPT2 page 242 may point to a PPT3 page of PPT3 245. For example, the first entry in PPT2 second PPT3 page, and so on.

PPT3 245 may include multiple PPT3 pages (e.g., PPT3 page 247). Each entry in PPT3 page 247 may point to a physical page of physical resources 250. For example, the first entry in PPT3 page 247 may point to a first physical page, the second entry in PPT3 page 247 may point to a second physical page, and so on. In some examples, each entry in PPT3 245 may include a direct logical-to-physical mapping between individual logical addresses and individual physical addresses.

Change log manager 220 may be configured to manage entries in change log buffer 207. For examples, change log manager 220 may be configured to maintain change log buffer 207 in a sorted order. In some examples, change log manager 220 is a part of controller 215. In other examples, change log manager 220 is separate from controller 215 and implemented in firmware. In some examples, instead of controller 215 writing logical-to-physical mappings directly in change log buffer 207, controller 215 may provide logical-to-physical mappings to change log manager 220, and change log manager 220 may write the logical-to-physical mappings to change log manager 220.

In some examples, to maintain change log buffer 207 in a sorted order, change log manager 220 may select a position for storing a logical-to-physical mappings in change log buffer 207 based on a logical address of a logical-to-physical mapping to be stored and logical addresses of logical-to-physical mappings currently stored in change log buffer 207. For example, change log buffer 207 may identify the logical addresses of the currently stored logical-to-physical mappings and store the logical-to-physical mapping at a position that is between a stored logical-to-physical mapping having a lower logical address and a stored logical-to-physical mapping having a higher logical address than the logical address of the logical-to-physical mapping to be stored.

Additionally, or alternatively, to maintain change log buffer 207 in a sorted order, change log manager 220 may writing the logical-to-physical mapping to be stored at an end of change log buffer 207. And, after writing the logical-to-physical mapping at the end of change log buffer 207, change log manager 220 may perform an operation for resorting the entries of change log buffer 207 so that the logical-to-physical mappings are arranged in a numerical order (e.g., an ascending order), where the numerical order may be based on the logical addresses of the logical-to-physical mappings.

Figure 3:
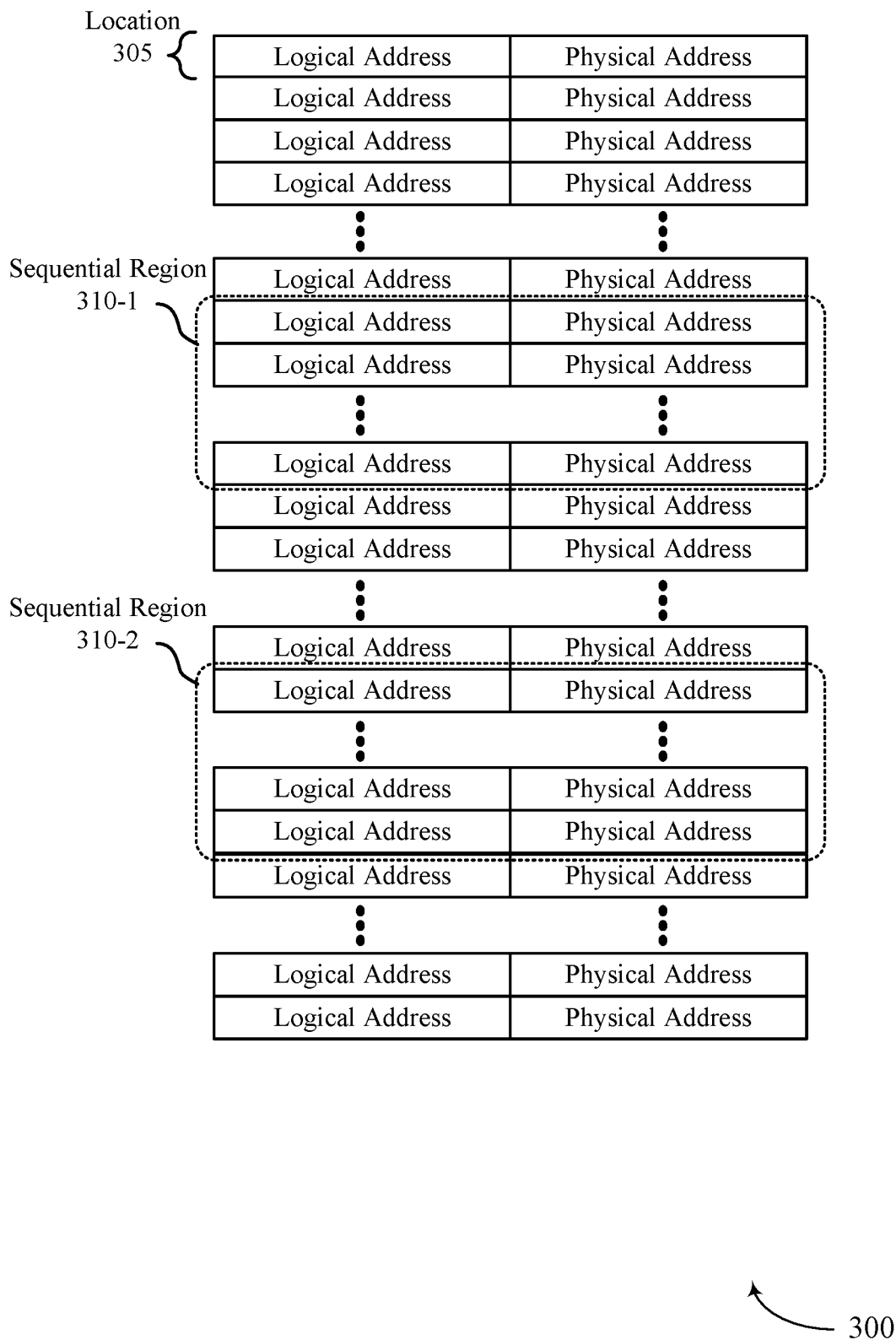
FIG. 3 illustrates an example of a change log buffer configuration that supports a sorted change log for physical page table compression in accordance with examples as disclosed herein.

FIG. 3 illustrates an example of a change log buffer configuration that supports a sorted change log for physical page table compression in accordance with examples as disclosed herein.

Change log buffer 300 is configured to store logical-to-physical mappings for recently completed write operations, the logical-to-physical mappings indicating relationships between logical addresses (used by a host system to store data) and physical addresses (used by a memory system to store data). Change log buffer 300 may be an example of change log buffer 207 of FIG. 2. Change log buffer 300 may include multiple locations (including location 305). An entry may be entered into change log buffer 300 at the different locations of change log buffer 300. An entry may be a logical-to-physical mapping including a logical address and a physical address. The logical-to-physical mapping may be used to indicate that information associated with a logical address (e.g., a logical block address) is stored at a physical address (e.g., a physical page address) of a memory system.

As described herein, the logical-to-physical mappings in change log buffer 300 may be sorted—e.g., based on respective logical address of the logical-to-physical mappings. In some examples, a new logical-to-physical mapping is entered into change log buffer 300 at a location that is based on a logical address of the logical-to-physical mapping. For example, the new logical-to-physical mapping may be entered into change log buffer 300 at a location that is between a first location used for a first logical-to-physical mapping having a logical address that is lower than the logical address of the new logical-to-physical mapping and a second location used for a second logical-to-physical mapping having a logical address that is higher than the logical address of the new logical-to-physical mapping. In other examples, a new logical-to-physical mapping is added to an empty location at an end of change log buffer 300, and the entries of the change log buffer 300 are later sorted (e.g., periodically, in response to certain events, etc.). A change log manager (e.g., change log manager 220 of FIG. 2) may be used to identify locations for logical-to-physical mappings with change log buffer 300, to sort entries of change log buffer 300, or both.

Based on sorting the entries in change log buffer 300, one or more sequential regions (e.g., first sequential region 310-1 and second sequential region 310-2) may be generated. A sequential region may be a region of change log buffer 300 that includes a threshold quantity of logical-to-physical mappings (e.g., 1024) that are sequential. That is, the logical-to-physical mappings in a sequential region may have respective logical addresses that fully span a range of logical addresses—e.g., LBA_1024 through LBA_2047. In some examples, the logical-to-physical mappings are arranged in order of their respective logical addresses. For example, the first logical-to-physical mapping of first sequential region 310-1 may include LBA_1024, the second logical-to-physical mapping of first sequential region 310-1 may include LBA_1025, and so on until the last logical-to-physical mapping of first sequential region 310-1, which may include LBA_2047. In other example, the logical-to-physical mapping are arranged in a different order than their respective logical addresses, so long as the logical-to-physical mappings within sequential region include the entire range of logical addresses.

The threshold quantity of logical-to-physical mappings in a sequential region may be based on a quantity of PPT3 entries included in a PPT3 page, as described with reference to FIG. 2. Additionally, the logical address of the starting and ending logical-to-physical mappings in a sequential region may be based on the starting and ending PPT3 entries of a PPT3 page. For example, the logical address of the starting logical-to-physical mapping in the sequential region may be equivalent to the starting logical address of the starting PPT3 entry in a PPT3 page and the logical address of the ending PPT3 entry in the PPT3 page.

In some examples, the sequential regions 310 are identified if they are realized. In other examples, the sequential regions 310 are identified if an operation for flushing change log buffer 300 is initiated.

Figure 4:
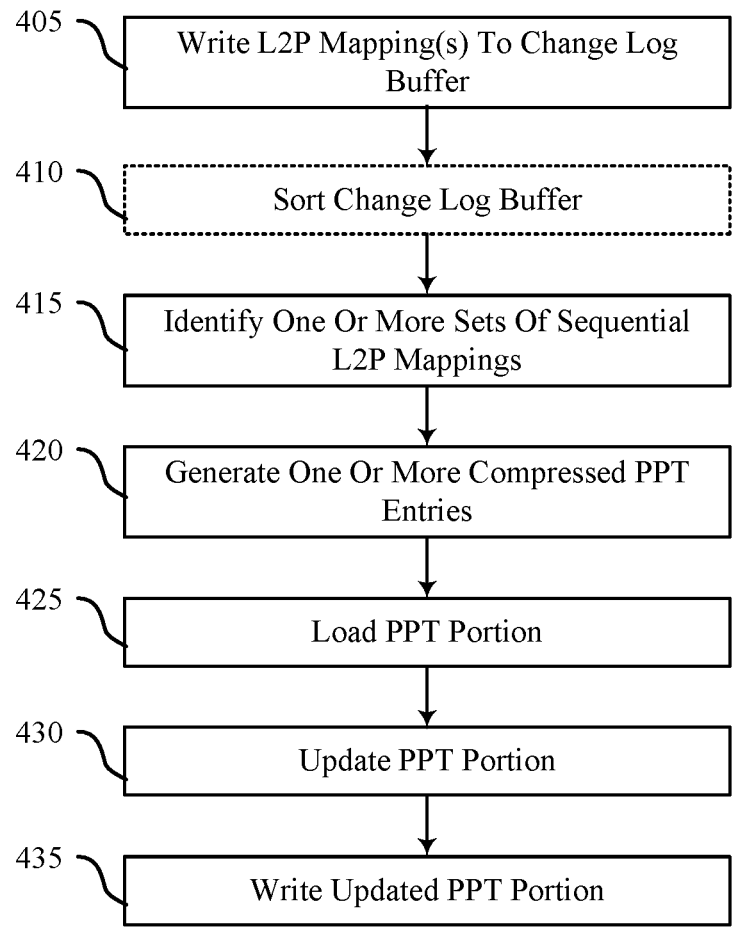
FIG. 4 illustrates an example of a flowchart for a sorted change log for physical page table compression in accordance with examples as disclosed herein.

FIG. 4 illustrates an example of a flowchart 400 for a sorted change log for physical page table compression in accordance with examples as disclosed herein.

Flowchart 400 may be performed by a memory system, or components of a memory system, as described herein including with reference to FIGS. 1 and 2. In some examples, flowchart 400 illustrates an example set of operations performed to support a sorted change log for physical page table compression. For example, flowchart 400 may include operations for sorting a change log buffer and identifying sequential regions of the sorted change log buffer.

Aspects of the flowchart 400 may be implemented by a controller, among other components. Additionally, or alternatively, aspects of the flowchart 400 may be implemented as instructions stored in memory (e.g., firmware stored in a memory coupled with a controller). For example, the instructions, if executed by a controller (e.g., the controller 215 of FIG. 2, the change log manager 220 of FIG. 2), may cause the controller to perform the operations of the flowchart 400.

One or more of the operations described in flowchart 400 may be performed earlier or later, omitted, replaced, supplemented, or combined with another operation. Also, additional operations described herein may replace, supplement or be combined with one or more of the operations described in flowchart 400.

At 405, one or more logical-to-physical mappings may be written to a change log buffer (e.g., change log buffer 207 of FIG. 2 or change log buffer 300 of FIG. 3). In some examples, a logical-to-physical mapping is based on a write operation performed in response to a write command, where the write command may indicate a logical address and be associated with a set of data, and where the set of data may be written to a physical address within a memory system. The logical-to-physical mapping may indicate the relationship between the logical address and the physical address. In some examples, the one or more logical-to-physical mappings are written to an end of (e.g., appended to) the entries in the change log buffer—e.g., to a first empty location of the change log buffer.

In other examples, the one or more logical-to-physical mappings are written to locations of the change log buffer based on their respective logical addresses. In such cases, for each logical-to-physical mapping, a logical address of each logical-to-physical mapping may be determined (e.g., by change log manager 220 of FIG. 2) and the determined logical addresses may be used to determine a location in the change log buffer for corresponding logical-to-physical mappings. One option for identifying a location in the change log buffer for a logical-to-physical mapping includes comparing a logical addresses of the logical-to-physical mapping with the logical addresses of logical-to-physical mappings already in the change log buffer and inserting the logical-to-physical mapping in between logical-to-physical mappings having logical addresses that are below and above the logical address of the logical-to-physical mapping. Another option for identifying a location in the change log buffer for a logical-to-physical mapping includes identifying a set of locations in (e.g., a region of) the change log buffer designated for logical-to-physical mappings having logical addresses with a range of logical addresses (e.g., LBA_1024 to LBA_2047) and adding the logical-to-physical mapping to a location in the region. For example, the logical-to-physical mapping may be added at a location that follows a location of a last logical-to-physical mapping entered into the region.

At 410, the change log buffer may be sorted (e.g., by change log manager 220). In some examples, the change log buffer is not separately sorted if the logical-to-physical mappings are written to the change log buffer in accordance with their logical addresses—e.g., if the logical addresses are already sorted based on the operations for writing to the change log buffer. In other examples, the change log buffer is separately sorted in addition to writing the logical-to-physical mappings to the change log buffer in accordance with their logical addresses. An additional sorting operation may be beneficial if the logical-to-physical mappings are written to the change log buffer with a lower level of accuracy (e.g., to reduce latency) as well as to correct any positioning errors. In some examples (e.g., if the second operation described above is used), the sorting operation may be used to organize logical-to-physical mappings in a region of the change log buffer in the order of their logical addresses.

In some examples, the sorting may be performed after each logical-to-physical mapping is written to the change log buffer. In some examples, the sorting may be performed at periodic intervals (e.g., once a millisecond). In some examples, the sorting may be performed in response to certain events occurring—e.g., each time a quantity of logical-to-physical mappings are written to the change log buffer, if the quantity of entries in the change log buffer reaches a threshold, if a power-down event is initiated, etc.

By storing the logical-to-physical mappings in a change log buffer in a sorted fashion, sets of logical-to-physical mappings that would otherwise be sequential—if not interrupted by other logical-to-physical mappings (e.g., generated for system operations)—may be rearranged to be sequential. In some examples, the change log buffer may be sorted to store multiple sets of sequential logical-to-physical mappings.

At 415, one or more sets of sequential logical-to-physical mappings may be identified in the change log buffer—e.g., based on the entries of the change log buffer being sorted. In some examples, the entire change log buffer is identified as including a set of sequential logical-to-physical mappings. In other examples, a first region of the change log buffer is identified as including a set of sequential logical-to-physical mappings and a second region of the change log buffer is identified as including another set of sequential logical-to-physical mappings.

Identifying a set of sequential logical-to-physical mappings may include identifying an initial logical-to-physical mapping in the change log buffer having a logical address (e.g., LBA_2048) that corresponds to a logical address of the initial PPT3 entry of a PPT3 page. In some examples, the following logical-to-physical mappings are sorted in the order of their logical addresses. Identifying the set of sequential logical-to-physical mappings may include determining that the following logical-to-physical mappings in the change log buffer have the logical addresses (e.g., LBA_2049 through LBA_4095) of the remaining PPT3 entries of the PPT3 page.

In some examples, the following logical-to-physical mappings are not sorted in the order of their logical address, and the set of logical-to-physical mappings may be determined based on the quantity of logical-to-physical mappings in a region starting with the initial logical-to-physical mapping satisfying a threshold quantity (e.g., 1024). In some examples, the mappings are not sorted in the order of their logical address, and the set of logical-to-physical mappings is determined based on identifying that an entry of a threshold quantity of entries (e.g., 1024 entries) away from the initial logical-to-physical mapping includes a logical address (e.g., LBA_4095) corresponding to a logical address of the last PPT3 entry of the PPT3 page and that all of the entries in between the initial logical-to-physical mapping and the ending logical-to-physical mapping are filled.

At 420, one or more compressed PPT entries may be generated based on the identified sequential logical-to-physical mappings. In some examples, the one or more compressed PPT entries are generated as soon as a set of sequential logical-to-physical mappings is identified. Additionally, or alternatively, the one or more compressed PPT entries may be generated in response to an operation for flushing a change log buffer being initiated. By enabling compressed PPT entries to be generated for portions of a change log buffer, PPT compression techniques may be utilized even if all of the logical-to-physical mappings in change log buffer are not sequential—increasing a likelihood that PPT compression techniques will be used.

At 425, a portion of a PPT (e.g., including a PPT1, PPT2, PPT3, or any combination thereof) may be loaded into a memory device (e.g., an SRAM device) from another memory device (e.g., a NAND device). In some examples, the portion of the PPT loaded into the memory device may be based on the entries of the change log buffer—e.g., may be inclusive of the entries of the change log buffer. The portion of the PPT may be loaded into the memory device in response to an operation for flushing the change log buffer being initiated—e.g., if the available capacity of the change log buffer falls below a threshold, if a power-down event is initiated, if a command to update the PPT at a NAND device is received, etc.)

At 430, the portion of the PPT loaded into the memory device may be updated based on the entries in the change log buffer. For logical-to-physical mappings in the change log buffer that are not included in a sequential set of logical-to-physical mappings, the logical-to-physical mappings may be used to update corresponding PPT3 entries. For logical-to-physical mappings in the change log buffer that are included in a sequential set of logical-to-physical mappings, the corresponding compressed PPT entry may be used to set a flag in a PPT2 entry that points to a PPT3 page including the logical address of the sequential set of logical-to-physical mappings. In such cases, the PPT3 entries of the PPT3 page may not themselves be updated.

At 435, the updated portions of the PPT may be written back to the NAND device. For the updated PPT3 entries, the corresponding PPT3 entries at the NAND device may be individually updated. For the updated PPT2 entries, the corresponding PPT2 entries may be individually updated, while the PPT3 entries in the PPT3 pages pointed to by the PPT2 entries may be unaltered, reducing a quantity of write operations to a portion of the NAND device storing the PPT. Performing fewer write operations to the NAND device may reduce latency associated with updating a PPT and extend an operating life of the NAND device.

Figure 5:
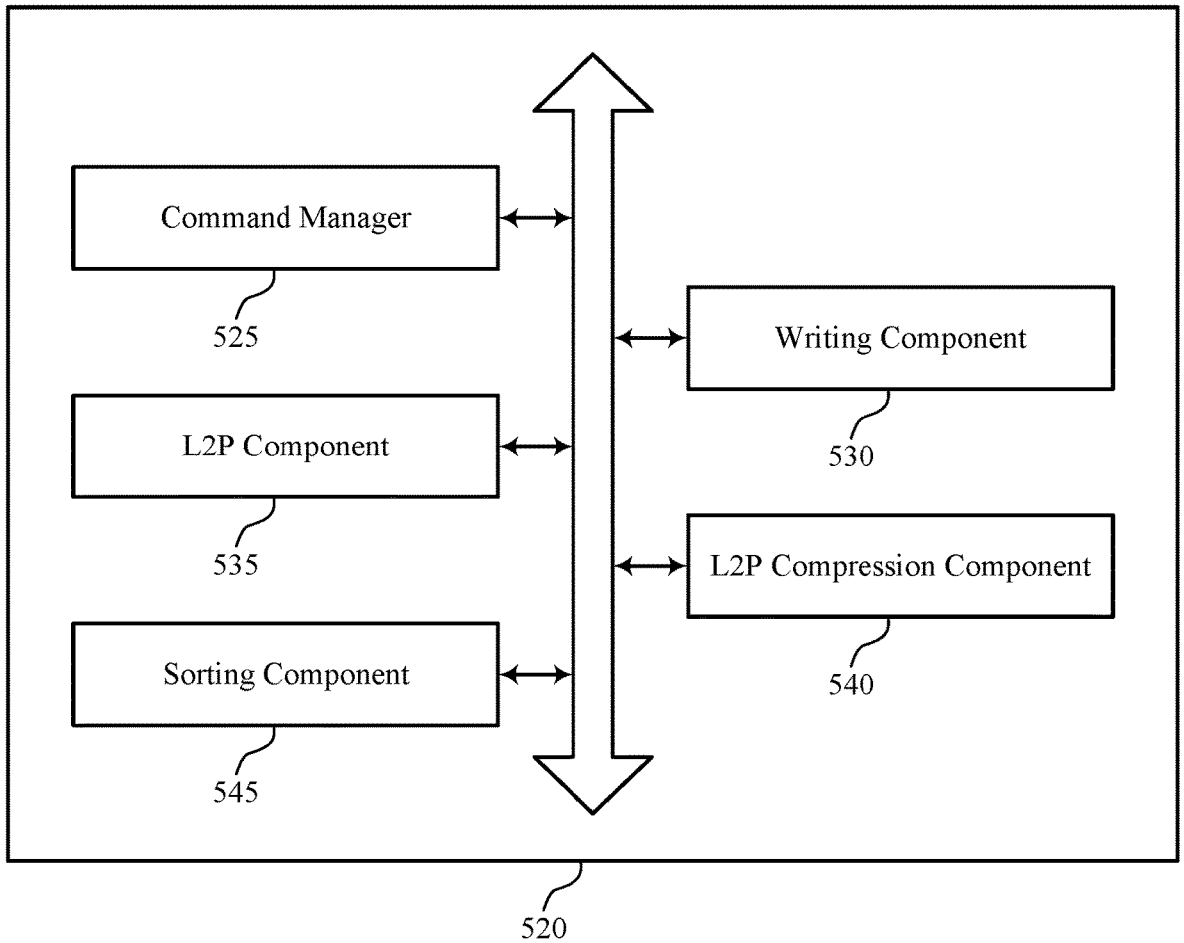
FIG. 5 shows a block diagram of a memory system that supports a sorted change log for physical page table compression in accordance with examples as disclosed herein.

FIG. 5 shows a block diagram 500 of a memory system 520 that supports a sorted change log for physical page table compression in accordance with examples as disclosed herein. The memory system 520 may be an example of aspects of a memory system as described with reference to FIGS. 1 through 4. The memory system 520, or various components thereof, may be an example of means for performing various aspects of sorted change log for physical page table compression as described herein. For example, the memory system 520 may include a command manager 525, a writing component 530, a L2P component 535, a L2P compression component 540, a sorting component 545, or any combination thereof. Each of these components may communicate, directly or indirectly, with one another (e.g., via one or more buses).

The command manager 525 may be configured as or otherwise support a means for receiving, from a host system, a write command that is associated with data and a logical address. The writing component 530 may be configured as or otherwise support a means for writing, in response to the write command, the data to a physical address. The L2P component 535 may be configured as or otherwise support a means for storing, based at least in part on the data being written to the physical address, a mapping at a location of a change log buffer, where the mapping indicates a relationship between the logical address and the physical address, and where the location of the mapping in the change log buffer is based at least in part on a value of the logical address relative to values of logical addresses of other mappings stored in the change log buffer. The L2P compression component 540 may be configured as or otherwise support a means for generating, based at least in part on storing the mapping at the location of the change log buffer, a compressed entry in a logical-to-physical table for a set of mappings stored in the change log buffer, the set of mappings including a set of sequentially-indexed logical addresses.

In some examples, the L2P compression component 540 may be configured as or otherwise support a means for determining, based at least in part on storing the mapping in the change log buffer, that the set of mappings includes the set of sequentially-indexed logical addresses.

In some examples, the L2P compression component 540 may be configured as or otherwise support a means for determining that a quantity of logical addresses in the set of sequentially-indexed logical addresses satisfies a threshold, where the compressed entry in the logical-to-physical table is generated based at least in part on the quantity of logical addresses satisfying the threshold.

In some examples, the sorting component 545 may be configured as or otherwise support a means for determining the logical address of the mapping is between a second logical address of a second mapping stored in a second location of the change log buffer and a third logical address of a third mapping stored in a third location of the change log buffer. In some examples, the sorting component 545 may be configured as or otherwise support a means for identifying the location based at least in part on the second location and the third location, where the mapping is stored at the location based at least in part on identifying the location.

In some examples, to support determining that the logical address is between the second logical address and the third logical address, the sorting component 545 may be configured as or otherwise support a means for comparing the logical address of the mapping with the logical addresses of the other mappings stored at the change log buffer. In some examples, to support determining that the logical address is between the second logical address and the third logical address, the sorting component 545 may be configured as or otherwise support a means for identifying, based at least in part on the comparing, that the second mapping includes the second logical address that is less than the logical address and that the third mapping includes the third logical address that is greater than the logical address.

In some examples, the command manager 525 may be configured as or otherwise support a means for receiving, from the host system, a second write command that is associated with second data and a fourth logical address. In some examples, the writing component 530 may be configured as or otherwise support a means for writing, in response to the second write command, the second data to a fourth physical address, where a fourth mapping indicates a relationship between the fourth logical address and the fourth physical address based at least in part on the second data being written to the fourth physical address. In some examples, the sorting component 545 may be configured as or otherwise support a means for determining the fourth logical address of the fourth mapping is between the logical address of the mapping and the third logical address of the third mapping. In some examples, the sorting component 545 may be configured as or otherwise support a means for storing the fourth mapping at a fourth location of the change log buffer, the fourth location being positioned between the location and the third location based at least in part on the fourth logical address being between the logical address and the third logical address.

In some examples, the L2P component 535 may be configured as or otherwise support a means for loading, from a non-volatile memory device, a portion of the logical-to-physical table. In some examples, the L2P component 535 may be configured as or otherwise support a means for modifying the portion of the logical-to-physical table based at least in part on mappings stored in the change log buffer, the mappings including the set of mappings and a second set of mappings. In some examples, the L2P component 535 may be configured as or otherwise support a means for writing, to the non-volatile memory device, the portion of the logical-to-physical table based at least in part on modifying the portion of the logical-to-physical table.

In some examples, the logical-to-physical table includes a first-level table and a second-level table. In some examples, modifying the portion of the logical-to-physical table further includes modifying one or more entries in the first-level table based at least in part on the second set of mappings; and modifying an entry in the second-level table based at least in part on the compressed entry. In some examples, the entry in the second-level table corresponds to a set of entries in the first-level table that encompasses the set of sequentially-indexed logical addresses.

In some examples, the second set of mappings includes non-sequentially-indexed logical addresses that are excluded from the set of sequentially-indexed logical addresses.

In some examples, the L2P compression component 540 may be configured as or otherwise support a means for generating a second compressed entry in the logical-to-physical table for a second set of mappings stored in the change log buffer, the second set of mappings including a second set of sequentially-indexed logical addresses stored in the change log buffer.

In some examples, the change log buffer includes a plurality of locations for storing mappings between logical addresses and physical addresses, the plurality of locations including the location, and the set of mappings is stored at a set of locations of the plurality of locations, the set of locations including the location.

In some examples, the change log buffer includes a plurality of locations for temporarily storing mappings between logical addresses and physical addresses based at least in part on data being written to physical addresses of a non-volatile memory device.

In some examples, the sorting component 545 may be configured as or otherwise support a means for ordering, based at least in part on storing the mapping in the change log buffer, mappings of the change log buffer based at least in part on the logical address of the mapping and the logical addresses of the other mappings, where generating the compressed entry is based at least in part on ordering the mappings.

Figure 6:
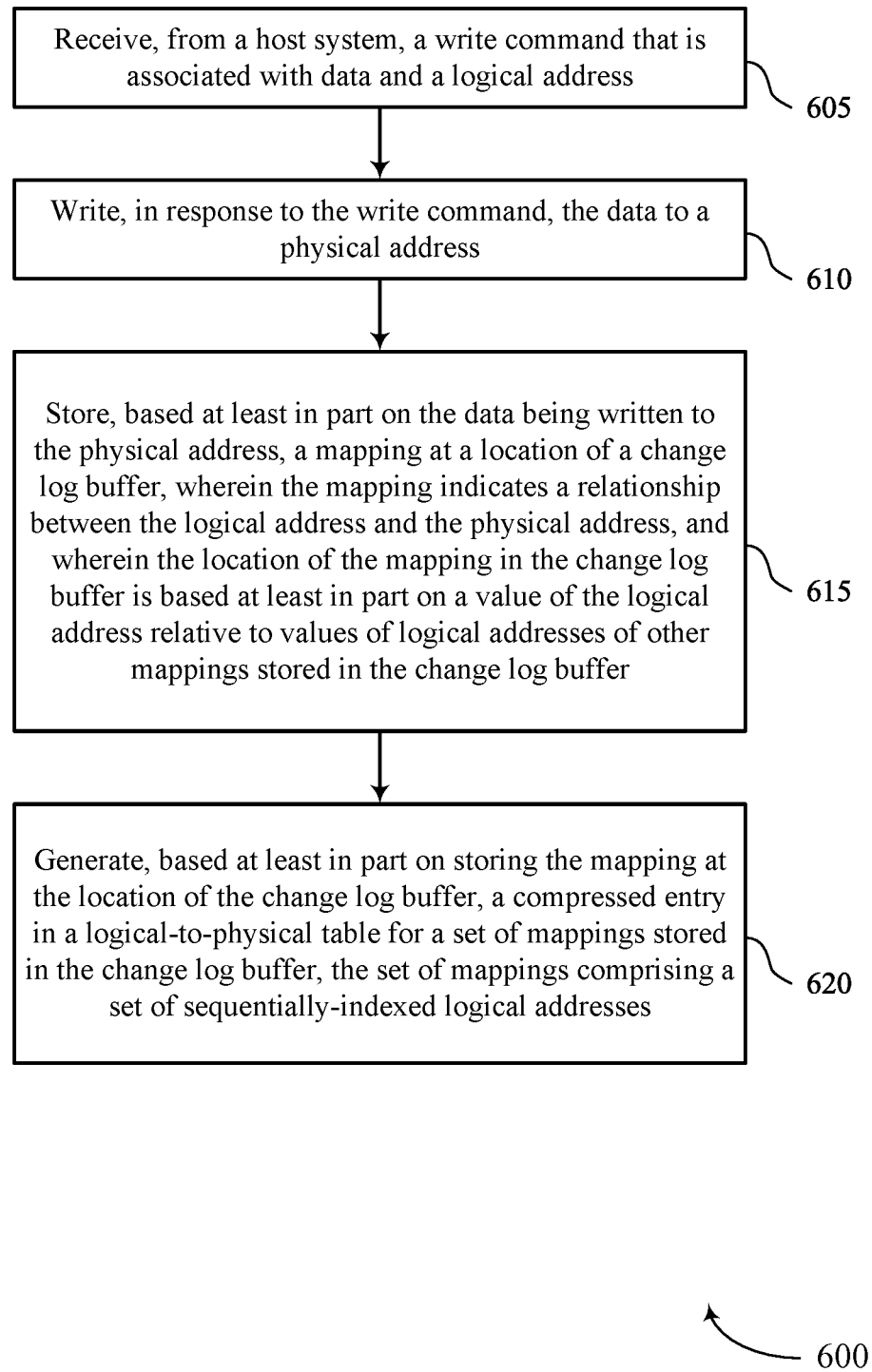
FIG. 6 shows a flowchart illustrating a method or methods that support sorted change log for physical page table compression in accordance with examples as disclosed herein.

FIG. 6 shows a flowchart illustrating a method 600 that supports a sorted change log for physical page table compression in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include receiving, from a host system, a write command that is associated with data and a logical address. The operations of 605 may be performed in accordance with examples as disclosed herein. In some examples, aspects of the operations of 605 may be performed by a command manager 525 as described with reference to FIG. 5.

At 610, the method may include writing, in response to the write command, the data to a physical address. The operations of 610 may be performed in accordance with examples as disclosed herein. In some examples, aspects of the operations of 610 may be performed by a writing component 530 as described with reference to FIG. 5.

At 615, the method may include storing, based at least in part on the data being written to the physical address, a mapping at a location of a change log buffer, where the mapping indicates a relationship between the logical address and the physical address, and where the location of the mapping in the change log buffer is based at least in part on a value of the logical address relative to values of logical addresses of other mappings stored in the change log buffer. The operations of 615 may be performed in accordance with examples as disclosed herein. In some examples, aspects of the operations of 615 may be performed by a L2P component 535 as described with reference to FIG. 5.

At 620, the method may include generating, based at least in part on storing the mapping at the location of the change log buffer, a compressed entry in a logical-to-physical table for a set of mappings stored in the change log buffer, the set of mappings including a set of sequentially-indexed logical addresses. The operations of 620 may be performed in accordance with examples as disclosed herein. In some examples, aspects of the operations of 620 may be performed by a L2P compression component 540 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, from a host system, a write command that is associated with data and a logical address; writing, in response to the write command, the data to a physical address; storing, based at least in part on the data being written to the physical address, a mapping at a location of a change log buffer, where the mapping indicates a relationship between the logical address and the physical address, and where the location of the mapping in the change log buffer is based at least in part on a value of the logical address relative to values of logical addresses of other mappings stored in the change log buffer; and generating, based at least in part on storing the mapping at the location of the change log buffer, a compressed entry in a logical-to-physical table for a set of mappings stored in the change log buffer, the set of mappings including a set of sequentially-indexed logical addresses.

Aspect 2: The method, apparatus, or non-transitory computer-readable medium of aspect 1, further including operations, features, circuitry, logic, means, or instructions, or any combination thereof for determining, based at least in part on storing the mapping in the change log buffer, that the set of mappings includes the set of sequentially-indexed logical addresses.

Aspect 3: The method, apparatus, or non-transitory computer-readable medium of any of aspects 1 through 2, further including operations, features, circuitry, logic, means, or instructions, or any combination thereof for determining that a quantity of logical addresses in the set of sequentially-indexed logical addresses satisfies a threshold, where the compressed entry in the logical-to-physical table is generated based at least in part on the quantity of logical addresses satisfying the threshold.

Aspect 4: The method, apparatus, or non-transitory computer-readable medium of any of aspects 1 through 3, further including operations, features, circuitry, logic, means, or instructions, or any combination thereof for determining the logical address of the mapping is between a second logical address of a second mapping stored in a second location of the change log buffer and a third logical address of a third mapping stored in a third location of the change log buffer and identifying the location based at least in part on the second location and the third location, where the mapping is stored at the location based at least in part on identifying the location.

Aspect 5: The method, apparatus, or non-transitory computer-readable medium of aspect 4 where determining that the logical address is between the second logical address and the third logical address, further includes operations, features, circuitry, logic, means, or instructions, or any combination thereof for comparing the logical address of the mapping with the logical addresses of the other mappings stored at the change log buffer and identifying, based at least in part on the comparing, that the second mapping includes the second logical address that is less than the logical address and that the third mapping includes the third logical address that is greater than the logical address.

Aspect 6: The method, apparatus, or non-transitory computer-readable medium of any of aspects 4 through 5, further including operations, features, circuitry, logic, means, or instructions, or any combination thereof for receiving, from the host system, a second write command that is associated with second data and a fourth logical address; writing, in response to the second write command, the second data to a fourth physical address, where a fourth mapping indicates a relationship between the fourth logical address and the fourth physical address based at least in part on the second data being written to the fourth physical address; determining the fourth logical address of the fourth mapping is between the logical address of the mapping and the third logical address of the third mapping; and storing the fourth mapping at a fourth location of the change log buffer, the fourth location being positioned between the location and the third location based at least in part on the fourth logical address being between the logical address and the third logical address.

Aspect 7: The method, apparatus, or non-transitory computer-readable medium of any of aspects 1 through 6, further including operations, features, circuitry, logic, means, or instructions, or any combination thereof for loading, from a non-volatile memory device, a portion of the logical-to-physical table; modifying the portion of the logical-to-physical table based at least in part on mappings stored in the change log buffer, the mappings including the set of mappings and a second set of mappings; and writing, to the non-volatile memory device, the portion of the logical-to-physical table based at least in part on modifying the portion of the logical-to-physical table.

Aspect 8: The method, apparatus, or non-transitory computer-readable medium of aspect 7 where the logical-to-physical table includes a first-level table and a second-level table; modifying the portion of the logical-to-physical table further includes modifying one or more entries in the first-level table based at least in part on the second set of mappings; and modifying an entry in the second-level table based at least in part on the compressed entry; and the entry in the second-level table corresponds to a set of entries in the first-level table that encompasses the set of sequentially-indexed logical addresses.

Aspect 9: The method, apparatus, or non-transitory computer-readable medium of any of aspects 7 through 8 where the second set of mappings includes non-sequentially-indexed logical addresses that are excluded from the set of sequentially-indexed logical addresses.

Aspect 10: The method, apparatus, or non-transitory computer-readable medium of any of aspects 1 through 9, further including operations, features, circuitry, logic, means, or instructions, or any combination thereof for generating a second compressed entry in the logical-to-physical table for a second set of mappings stored in the change log buffer, the second set of mappings including a second set of sequentially-indexed logical addresses stored in the change log buffer.

Aspect 11: The method, apparatus, or non-transitory computer-readable medium of any of aspects 1 through 10 where the change log buffer includes a plurality of locations for storing mappings between logical addresses and physical addresses, the plurality of locations including the location, and the set of mappings is stored at a set of locations of the plurality of locations, the set of locations including the location.

Aspect 12: The method, apparatus, or non-transitory computer-readable medium of any of aspects 1 through 11 where the change log buffer includes a plurality of locations for temporarily storing mappings between logical addresses and physical addresses based at least in part on data being written to physical addresses of a non-volatile memory device.

Aspect 13: The method, apparatus, or non-transitory computer-readable medium of any of aspects 1 through 12, further including operations, features, circuitry, logic, means, or instructions, or any combination thereof for ordering, based at least in part on storing the mapping in the change log buffer, mappings of the change log buffer based at least in part on the logical address of the mapping and the logical addresses of the other mappings, where generating the compressed entry is based at least in part on ordering the mappings.

It should be noted that the methods described above describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 14: An apparatus, including: a memory device; and a controller coupled with the memory device and configured to cause the apparatus to: receive, from a host system, a write command that is associated with data and a logical address; write, in response to the write command, the data to a physical address; store, based at least in part on the data being written to the physical address, a mapping at a location of a change log buffer, where the mapping indicates a relationship between the logical address and the physical address, and where the location of the mapping in the change log buffer is based at least in part on a value of the logical address relative to values of logical addresses of other mappings stored in the change log buffer; and generate, based at least in part on storing the mapping at the location of the change log buffer, a compressed entry in a logical-to-physical table for a set of mappings stored in the change log buffer, the set of mappings including a set of sequentially-indexed logical addresses.

Aspect 15: The apparatus of aspect 14, where the controller is further configured to cause the apparatus to: determine, based at least in part on storing the mapping in the change log buffer, that the set of mappings includes the set of sequentially-indexed logical addresses.

Aspect 16: The apparatus of any of aspects 14 through 15, where the controller is further configured to cause the apparatus to: determine that a quantity of logical addresses in the set of sequentially-indexed logical addresses satisfies a threshold, where the compressed entry in the logical-to-physical table is generated based at least in part on the quantity of logical addresses satisfying the threshold.

Aspect 17: The apparatus of any of aspects 14 through 16, where the controller is further configured to cause the apparatus to: determine the logical address of the mapping is between a second logical address of a second mapping stored in a second location of the change log buffer and a third logical address of a third mapping stored in a third location of the change log buffer; and identify the location based at least in part on the second location and the third location, where the mapping is stored at the location based at least in part on identifying the location.

Aspect 18: The apparatus of aspect 17, where, to determine the logical address is between the second logical address and the third logical address, the controller is further configured to cause the apparatus to: compare the logical address of the mapping with the logical addresses of the other mappings stored at the change log buffer; and identify, based at least in part on the comparing, that the second mapping includes the second logical address that is less than the logical address and that the third mapping includes the third logical address that is greater than the logical address.

Aspect 19: The apparatus of any of aspects 17 through 18, where the controller is further configured to cause the apparatus to: receive, from the host system, a second write command that is associated with second data and a fourth logical address; write, in response to the second write command, the second data to a fourth physical address, where a fourth mapping indicates a relationship between the fourth logical address and the fourth physical address based at least in part on the second data being written to the fourth physical address; determine the fourth logical address of the fourth mapping is between the logical address of the mapping and the third logical address of the third mapping; and store the fourth mapping at a fourth location of the change log buffer, the fourth location being positioned between the location and the third location based at least in part on the fourth logical address being between the logical address and the third logical address.

Aspect 20: The apparatus of any of aspects 14 through 19, where the controller is further configured to cause the apparatus to: load, from a non-volatile memory device, a portion of the logical-to-physical table; modify the portion of the logical-to-physical table based at least in part on mappings stored in the change log buffer, the mappings including the set of mappings and a second set of mappings; and write, to the non-volatile memory device, the portion of the logical-to-physical table based at least in part on modifying the portion of the logical-to-physical table.

Aspect 21: The apparatus of aspect 20, where the logical-to-physical table includes a first-level table and a second-level table, and where, to modify the portion of the logical-to-physical table, the controller is further configured to cause the apparatus to: modify one or more entries in the first-level table based at least in part on the second set of mappings; and modify an entry in the second-level table based at least in part on the compressed entry, where the entry in the second-level table corresponds to a set of entries in the first-level table that encompasses the set of sequentially-indexed logical addresses.

Aspect 22: The apparatus of any of aspects 20 through 21, where the second set of mappings includes non-sequentially-indexed logical addresses that are excluded from the set of sequentially-indexed logical addresses.

Aspect 23: The apparatus of any of aspects 14 through 22, where the controller is further configured to cause the apparatus to: generate a second entry in the logical-to-physical table for a second set of mappings stored in the change log buffer, the second set of mappings including a second set of sequentially-indexed logical addresses stored in the change log buffer.

Aspect 24: The apparatus of any of aspects 14 through 23, where: the change log buffer includes a plurality of locations for storing mappings between logical addresses and physical addresses, the plurality of locations including the location, and the set of mappings is stored at a set of locations of the plurality of locations, the set of locations including the location.

Aspect 25: The apparatus of any of aspects 14 through 24, where the change log buffer includes a plurality of locations for temporarily storing mappings between logical addresses and physical addresses based at least in part on data being written to physical addresses of a non-volatile memory device.

Aspect 26: The apparatus of any of aspects 14 through 25, further including: a change log management circuit configured to order, based at least in part on storing the mapping in the change log buffer, mappings of the change log buffer based at least in part on the logical address of the mapping and the logical addresses of the other mappings, where generating the compressed entry is based at least in part on ordering the mappings.

An apparatus is described. The following provides an overview of aspects of the apparatus as described herein:

Aspect 27: A non-transitory, computer-readable medium storing code including instructions which, when executed by a processor of an electronic device, cause the electronic device to: receive, from a host system, a write command that is associated with data and a logical address; write, in response to the write command, the data to a physical address; store, based at least in part on the data being written to the physical address, a mapping at a location of a change log buffer, where the mapping indicates a relationship between the logical address and the physical address, and where the location of the mapping in the change log buffer is based at least in part on a value of the logical address relative to values of logical addresses of other mappings stored in the change log buffer; and generate, based at least in part on storing the mapping at the location of the change log buffer, a compressed entry in a logical-to-physical table for a set of mappings stored in the change log buffer, the set of mappings including a set of sequentially-indexed logical addresses.

Aspect 28: The non-transitory, computer-readable medium of aspect 27, where the instructions are further executable by the processor to cause the electronic device to: determine, based at least in part on storing the mapping in the change log buffer, that the set of mappings includes the set of sequentially-indexed logical addresses.

Aspect 29: The non-transitory, computer-readable medium of any of aspects 27 through 28, where the instructions are further executable by the processor to cause the electronic device to: determine that a quantity of logical addresses in the set of sequentially-indexed logical addresses satisfies a threshold, where the compressed entry in the logical-to-physical table is generated based at least in part on the quantity of logical addresses satisfying the threshold.

Aspect 30: The non-transitory, computer-readable medium of any of aspects 27 through 29, where the instructions are further executable by the processor to cause the electronic device to: determine the logical address of the mapping is between a second logical address of a second mapping stored in a second location of the change log buffer and a third logical address of a third mapping stored in a third location of the change log buffer; and identify the location based at least in part on the second location and the third location, where the mapping is stored at the location based at least in part on identifying the location.

Aspect 31: The non-transitory, computer-readable medium of any of aspects 27 through 30, where the instructions are further executable by the processor to cause the electronic device to: load, from a non-volatile memory device, a portion of the logical-to-physical table; modify the portion of the logical-to-physical table based at least in part on mappings stored in the change log buffer, the mappings including the set of mappings and a second set of mappings; and write, to the non-volatile memory device, the portion of the logical-to-physical table based at least in part on modifying the portion of the logical-to-physical table.

Aspect 32: The non-transitory, computer-readable medium of any of aspects 27 through 31, where the instructions are further executable by the processor to cause the electronic device to: generate a second entry in the logical-to-physical table for a second set of mappings stored in the change log buffer, the second set of mappings including a second set of sequentially-indexed logical addresses stored in the change log buffer.

Aspect 33: The non-transitory, computer-readable medium of any of aspects 27 through 32, where the instructions are further executable by the processor to cause the electronic device to: order, based at least in part on storing the mapping in the change log buffer, mappings of the change log buffer based at least in part on the logical address of the mapping and the logical addresses of the other mappings, where generating the compressed entry is based at least in part on ordering the mappings.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices; and
processing circuitry coupled with the one or more memory devices and configured to cause the memory system to:
receive, from a host system, a write command that is associated with data and a logical address;
write, in response to the write command, the data to a physical address;
store, based at least in part on the data being written to the physical address, a mapping at a location of a change log buffer, wherein the mapping indicates a relationship between the logical address and the physical address;
compare a value of the logical address with values of logical addresses of other mappings stored in the change log buffer, wherein the location of the mapping that is stored in the change log buffer is based at least in part on comparing the value of the logical address with the values of logical addresses of the other mappings stored in the change log buffer;
identify a set of sequentially-indexed logical addresses stored in the change log buffer based at least in part on comparing the value of the logical address relative to the values of logical addresses of the other mappings stored in the change log buffer;
generate, based at least in part on identifying the set of sequentially-indexed logical addresses stored in the change log buffer, a compressed entry in a logical-to-physical table for a set of mappings stored in the change log buffer, the set of mappings comprising the set of sequentially-indexed logical addresses; and
write, to a non-volatile memory device, a portion of the logical-to-physical table, wherein the portion of the logical-to-physical table comprises the compressed entry for the set of sequentially-indexed logical addresses.

2. The memory system of claim 1, wherein the processing circuitry is further configured to cause the memory system to:
determine, based at least in part on storing the mapping in the change log buffer, that the set of mappings comprises the set of sequentially-indexed logical addresses.

3. The memory system of claim 1, wherein the processing circuitry is further configured to cause the memory system to:
determine that a quantity of logical addresses in the set of sequentially-indexed logical addresses satisfies a threshold,
wherein the compressed entry in the logical-to-physical table is generated based at least in part on the quantity of logical addresses satisfying the threshold.

4. The memory system of claim 1, wherein the processing circuitry is further configured to cause the memory system to:
determine the logical address of the mapping is between a second logical address of a second mapping stored in a second location of the change log buffer and a third logical address of a third mapping stored in a third location of the change log buffer; and
identify the location based at least in part on the second location and the third location,
wherein the mapping is stored at the location based at least in part on identifying the location.

5. The memory system of claim 4, wherein, to determine the logical address is between the second logical address and the third logical address, the processing circuitry is further configured to cause the memory system to:
identify, based at least in part on the comparing, that the second mapping comprises the second logical address that is less than the logical address and that the third mapping comprises the third logical address that is greater than the logical address.

6. The memory system of claim 4, wherein the processing circuitry is further configured to cause the memory system to:
receive, from the host system, a second write command that is associated with second data and a fourth logical address;
write, in response to the second write command, the second data to a fourth physical address, wherein a fourth mapping indicates a relationship between the fourth logical address and the fourth physical address based at least in part on the second data being written to the fourth physical address;
determine the fourth logical address of the fourth mapping is between the logical address of the mapping and the third logical address of the third mapping; and
store the fourth mapping at a fourth location of the change log buffer, the fourth location being positioned between the location and the third location based at least in part on the fourth logical address being between the logical address and the third logical address.

7. The memory system of claim 1, wherein the processing circuitry is further configured to cause the memory system to:
load, from the non-volatile memory device, the portion of the logical-to-physical table; and
modify the portion of the logical-to-physical table based at least in part on mappings stored in the change log buffer, the mappings comprising the set of mappings and a second set of mappings, wherein writing, to the non-volatile memory device, the portion of the logical-to-physical table is based at least in part on modifying the portion of the logical-to-physical table.

8. The memory system of claim 7, wherein the logical-to-physical table comprises a first-level table and a second-level table, and wherein, to modify the portion of the logical-to-physical table, the processing circuitry is further configured to cause the memory system to:
modify one or more entries in the first-level table based at least in part on the second set of mappings; and
modify an entry in the second-level table based at least in part on the compressed entry, wherein the entry in the second-level table corresponds to a set of entries in the first-level table that encompasses the set of sequentially-indexed logical addresses.

9. The memory system of claim 7, wherein the second set of mappings comprises non-sequentially-indexed logical addresses that are excluded from the set of sequentially-indexed logical addresses.

10. The memory system of claim 1, wherein the processing circuitry is further configured to cause the memory system to:
generate a second compressed entry in the logical-to-physical table for a second set of mappings stored in the change log buffer, the second set of mappings comprising a second set of sequentially-indexed logical addresses stored in the change log buffer.

11. The memory system of claim 1, wherein:
the change log buffer comprises a plurality of locations for storing mappings between logical addresses and physical addresses, the plurality of locations comprising the location, and
the set of mappings is stored at a set of locations of the plurality of locations, the set of locations comprising the location.

12. The memory system of claim 1, wherein the change log buffer comprises a plurality of locations for temporarily storing mappings between logical addresses and physical addresses based at least in part on the data being written to physical addresses of the non-volatile memory device.

13. The memory system of claim 1, further comprising:
a change log management circuit configured to order, based at least in part on storing the mapping in the change log buffer, mappings of the change log buffer based at least in part on the logical address of the mapping and the logical addresses of the other mappings,
wherein generating the compressed entry is based at least in part on ordering the mappings.

14. A non-transitory, computer-readable medium storing code comprising instructions which, when executed by a processing circuitry of an electronic device, cause the electronic device to:
receive, from a host system, a write command that is associated with data and a logical address;
write, in response to the write command, the data to a physical address;
store, based at least in part on the data being written to the physical address, a mapping at a location of a change log buffer, wherein the mapping indicates a relationship between the logical address and the physical address;
compare a value of the logical address with values of logical addresses of other mappings stored in the change log buffer, and wherein the location of the mapping that is stored in the change log buffer is based at least in part on comparing the value of the logical address with the values of logical addresses of the other mappings stored in the change log buffer;
identify a set of sequentially-indexed logical addresses stored in the change log buffer based at least in part on comparing the value of the logical address relative to the values of logical addresses of the other mappings stored in the change log buffer;
generate, based at least in part on identifying the set of sequentially-indexed logical addresses stored in the change log buffer, a compressed entry in a logical-to-physical table for a set of mappings stored in the change log buffer, the set of mappings comprising the set of sequentially-indexed logical addresses; and
write, to a non-volatile memory device, a portion of the logical-to-physical table, wherein the portion of the logical-to-physical table comprises the compressed entry for the set of sequentially-indexed logical addresses.

15. The non-transitory, computer-readable medium of claim 14, wherein the instructions are further executable by the processing circuitry to cause the electronic device to:
determine, based at least in part on storing the mapping in the change log buffer, that the set of mappings comprises the set of sequentially-indexed logical addresses.

16. The non-transitory, computer-readable medium of claim 14, wherein the instructions are further executable by the processing circuitry to cause the electronic device to:
determine that a quantity of logical addresses in the set of sequentially-indexed logical addresses satisfies a threshold,
wherein the compressed entry in the logical-to-physical table is generated based at least in part on the quantity of logical addresses satisfying the threshold.

17. The non-transitory, computer-readable medium of claim 14, wherein the instructions are further executable by the processing circuitry to cause the electronic device to:
determine the logical address of the mapping is between a second logical address of a second mapping stored in a second location of the change log buffer and a third logical address of a third mapping stored in a third location of the change log buffer; and
identify the location based at least in part on the second location and the third location,
wherein the mapping is stored at the location based at least in part on identifying the location.

18. The non-transitory, computer-readable medium of claim 14, wherein the instructions are further executable by the processing circuitry to cause the electronic device to:
load, from the non-volatile memory device, the portion of the logical-to-physical table; and
modify the portion of the logical-to-physical table based at least in part on mappings stored in the change log buffer, the mappings comprising the set of mappings and a second set of mappings, wherein writing, to the non-volatile memory device, the portion of the logical-to-physical table is based at least in part on modifying the portion of the logical-to-physical table.

19. The non-transitory, computer-readable medium of claim 14, wherein the instructions are further executable by the processing circuitry to cause the electronic device to:
generate a second entry in the logical-to-physical table for a second set of mappings stored in the change log buffer, the second set of mappings comprising a second set of sequentially-indexed logical addresses stored in the change log buffer.

20. The non-transitory, computer-readable medium of claim 14, wherein the instructions are further executable by the processing circuitry to cause the electronic device to:
order, based at least in part on storing the mapping in the change log buffer, mappings of the change log buffer based at least in part on the logical address of the mapping and the logical addresses of the other mappings,
wherein generating the compressed entry is based at least in part on ordering the mappings.

21. A method, comprising:
receiving, from a host system, a write command that is associated with data and a logical address;
writing, in response to the write command, the data to a physical address;
storing, based at least in part on the data being written to the physical address, a mapping at a location of a change log buffer, wherein the mapping indicates a relationship between the logical address and the physical address;
comparing a value of the logical address with values of logical addresses of other mappings stored in the change log buffer, and wherein the location of the mapping that is stored in the change log buffer is based at least in part on comparing the value of the logical address with the values of logical addresses of the other mappings stored in the change log buffer;
identifying a set of sequentially-indexed logical addresses stored in the change log buffer based at least in part on comparing the value of the logical address relative to the values of logical addresses of the other mappings stored in the change log buffer;

generating, based at least in part on identifying the set of sequentially-indexed logical addresses stored in the change log buffer, a compressed entry in a logical-to-physical table for a set of mappings stored in the change log buffer, the set of mappings comprising the set of sequentially-indexed logical addresses; and writing, to a non-volatile memory device, a portion of the logical-to-physical table, wherein the portion of the logical-to-physical table comprises the compressed entry for the set of sequentially-indexed logical addresses.

22. The method of claim 21, further comprising:
determining, based at least in part on storing the mapping in the change log buffer, that the set of mappings comprises the set of sequentially-indexed logical addresses.

23. The method of claim 21, further comprising:
determining that a quantity of logical addresses in the set of sequentially-indexed logical addresses satisfies a threshold, wherein the compressed entry in the logical-to-physical table is generated based at least in part on the quantity of logical addresses satisfying the threshold.

24. The method of claim 21, further comprising:
determining the logical address of the mapping is between a second logical address of a second mapping stored in a second location of the change log buffer and a third logical address of a third mapping stored in a third location of the change log buffer; and identifying the location based at least in part on the second location and the third location, wherein the mapping is stored at the location based at least in part on identifying the location.

25. The method of claim 21, further comprising:
ordering, by a change log management circuit and based at least in part on storing the mapping in the change log buffer, mappings of the change log buffer based at least in part on the logical address of the mapping and the logical addresses of the other mappings, wherein generating the compressed entry is based at least in part on ordering the mappings.

* * * * *